(12) United States Patent  
Harrington et al.

(10) Patent No.: US 9,347,362 B2
(45) Date of Patent: May 24, 2016

(54) ADJUSTABLE MOUNTING SYSTEM FOR AFTERTREATMENT OR EXHAUST COMPONENTS

(71) Applicant: Cummins Emission Solutions, Inc., Columbus, IN (US)

(72) Inventors: Alex Harrington, Columbus, IN (US); Ken Hummel, Barneveld, WI (US); Karthik Muruganantham, Stoughton, WI (US); Raghunath Thakar, Madison, WI (US)

(73) Assignee: Cummins Emission Solutions, Inc., Columbus, IN (US)

( * ) Notice: Subject to any disclaimer, the term of this patent is extended or adjusted under 35 U.S.C. 154(b) by 11 days.

(21) Appl. No.: 14/485,095

(22) Filed: Sep. 12, 2014

(65) Prior Publication Data
US 2016/0076429 A1    Mar. 17, 2016

(51) Int. Cl.
*F16M 11/00*     (2006.01)
*F01N 13/18*     (2010.01)
*B60K 13/04*     (2006.01)
*F01N 3/035*     (2006.01)

(52) U.S. Cl.
CPC ............ *F01N 13/1844* (2013.01); *B60K 13/04* (2013.01); *F01N 3/035* (2013.01)

(58) Field of Classification Search
CPC ...... F01N 13/1844; F01N 3/035; B60K 13/04
USPC .................... 248/201, 608, 609, 638, 634, 62
See application file for complete search history.

(56) References Cited

U.S. PATENT DOCUMENTS

| | | | | |
|---|---|---|---|---|
| 3,746,127 A | * | 7/1973 | Leventhal | F01N 13/1822 181/243 |
| 5,570,861 A | * | 11/1996 | Olsen | B60K 13/04 180/296 |
| 5,908,187 A | * | 6/1999 | Kalkoske | F16L 55/035 248/60 |
| 5,924,655 A | * | 7/1999 | Rinderer | E21F 17/02 248/55 |
| 6,095,460 A | * | 8/2000 | Mercer | B60K 13/04 180/309 |
| 6,481,673 B1 | * | 11/2002 | Roe | B60K 13/04 248/300 |
| 2009/0188923 A1 | * | 7/2009 | Versaw, Jr. | B60K 13/04 220/564 |
| 2012/0312954 A1 | * | 12/2012 | Rodecker | F01N 13/1822 248/617 |
| 2013/0251557 A1 | * | 9/2013 | Ota | F04B 17/03 417/410.1 |
| 2014/0284131 A1 | * | 9/2014 | Hull | E02F 9/0866 180/291 |

* cited by examiner

*Primary Examiner* — Mark Wendell
(74) *Attorney, Agent, or Firm* — Foley & Lardner LLP (57) ABSTRACT

A mounting system for an exhaust system component may include one or more end mounting brackets and one or more intermediary mounting brackets. Each of the one or more end mounting brackets and the one or more intermediary mounting brackets may each include a vertical member, a horizontal member, one or more attachment openings, and an attachment strap configured to secure a component of an exhaust system to the respective end mounting bracket or intermediary mounting bracket. The one or more end mounting brackets and the one or more intermediary mounting brackets may be configured to be selectively attached and detached from a mounting surface via one or more surface attachment members and the one or more attachment openings.

20 Claims, 4 Drawing Sheets

ADJUSTABLE MOUNTING SYSTEM FOR AFTERTREATMENT OR EXHAUST COMPONENTS

TECHNICAL FIELD

The present application relates generally to the field of mounting systems. More specifically, the present application relates to adjustable or reconfigurable mounting systems for aftertreatment exhaust components.

BACKGROUND

For internal combustion engines, such as diesel engines, nitrogen oxides ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber. The aftertreatment components for the SCR system and/or other exhaust system components are typically mounted to a vehicle chassis or power generation frame are fixed, predetermined positions. Such fixation at predetermined positions limits the configuration and components for the aftertreatment system and/or exhaust system to the original configuration and components from the original system.

SUMMARY

Implementations described herein relate to adjustable and/or reconfigurable mounting systems for aftertreatment system components and/or exhaust system components. One or more mounting brackets may be adjustable and/or reconfigurably attachable to a vehicle chassis or other frame to adjust a size, configuration, and/or orientation of the mounting brackets. Such adjustability and/or reconfigurability allows end users and/or system designers to utilize different components, modify the orientation and/or location of current components, eliminate components, and/or add components to an aftertreatment system and/or exhaust system without relying on being constrained to the original mounting systems.

One implementation relates to a mounting system for a component of an exhaust system. The mounting system includes one or more end mounting brackets and one or more intermediary mounting brackets. Each of the one or more end mounting brackets includes an end mounting bracket vertical member, an end mounting horizontal bracket member, one or more end mounting bracket attachment openings extending through a portion of the end mounting vertical member or the end mounting horizontal member, and an end mounting bracket attachment strap configured to secure a component of an exhaust system to the end mounting bracket vertical member and the end mounting bracket horizontal member. Each of the one or more intermediary mounting brackets includes an intermediary mounting bracket vertical member, an intermediary mounting bracket horizontal member, one or more intermediary mounting bracket attachment openings extending through a portion of the intermediary mounting bracket vertical member or the intermediary mounting bracket horizontal member, and an intermediary mounting bracket attachment strap configured to secure the component of the exhaust system to the intermediary mounting bracket vertical member and the intermediary mounting bracket horizontal member. The one or more end mounting brackets and the one or more intermediary mounting brackets are configured to be selectively attached and detached from a mounting surface via one or more surface attachment members using the one or more end mounting bracket attachment openings or the one or more intermediary mounting bracket attachment openings, respectively.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for an adjustable and/or reconfigurable mounting system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Exhaust systems, such as those for vehicles, power generation units, and/or other implementations having an internal combustion engine, are typically predetermined based on the design of the vehicle, power generation unit, and/or other implementation in which the exhaust system is to be utilized. The components of the exhaust system, which may include aftertreatment components, may typically have mounting systems and/or brackets that are fixed and/or integrated into predetermined locations and/or configurations to a vehicle chassis, a power generation unit frame, and/or other frame, such as via welding, unitary construction, etc., where the mounting system is made a part of the vehicle chassis, power generation unit frame, and/or other frame. Such fixation and/ or integration at predetermined positions and/or configurations limits the configuration and components for the aftertreatment system and/or exhaust system to the original configuration and components from the original system. That is, the mounting systems affixed to and/or integrated into the chassis or frame may not be adaptable to and/or reconfigurable for a different component, a different location, a different orientation, a different configuration, and/or removal and/or addition of other components. Such mounting systems may be affixed to the chassis or frame to comply with loading requirements and/or regulations. That is, affixing and/or integrating the mounting system to the chassis or frame may be needed to withstand forces applied directly or indirectly to the component to be secured.

Various embodiments provide for an adaptable and/or reconfigurable mounting system for exhaust and/or aftertreatment components that also can comply with the loading requirements and/or regulations. Such an adaptable and/or reconfigurable mounting system may be useful to permit an end user and/or system designer to modify the positioning, configuration, type, and/or presence of one or more components for an exhaust system and/or aftertreatment system with minimal changes to the underlying chassis or frame to accommodate such changes. Moreover, such an adaptable and/or reconfigurable mounting system may permit easier installation of exhaust and/or aftertreatment components by permitting the component to be attached to the mounting system and then attaching the mounting system to the chassis or frame. Such an adaptable and/or reconfigurable mounting system may allow an end user or system designer to loosen one or more mounting bolts from attachment points on a chassis or frame, adjust and/or relocate the adjustable mounting system relative to the chassis or frame, and retighten the mounting system to specified torque parameters such that the mounting system complies with loading requirements and/or regulations. This allows the customers to quickly modify a mounting location if desired to make installation easier. The mounting system could also easily be removed in the event of a failure or service event.

II. Overview of Exhaust and/or Aftertreatment System

Figure 1:
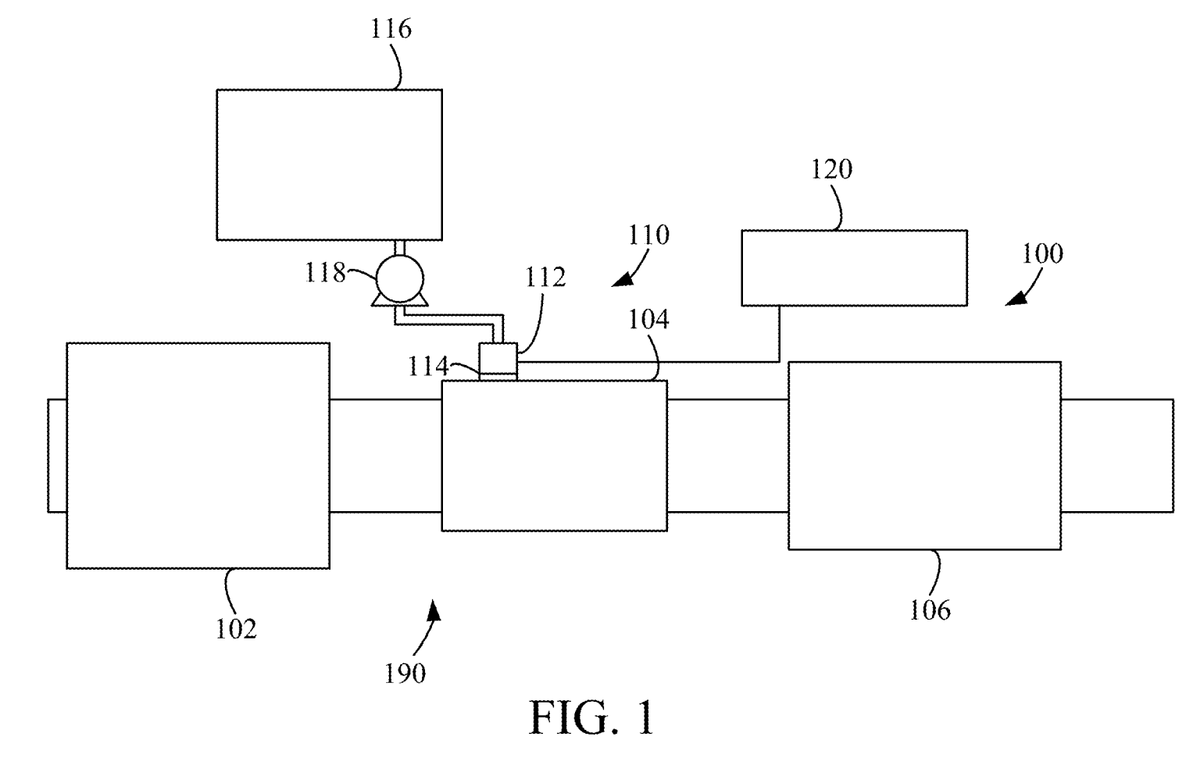
FIG. 1 is a block schematic diagram of an implementation of a selective catalytic reduction system having a reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the urea, aqueous ammonia, or DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NO emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

III. Implementation of an Adjustable and/or Reconfigurable Mounting System

Figure 2:
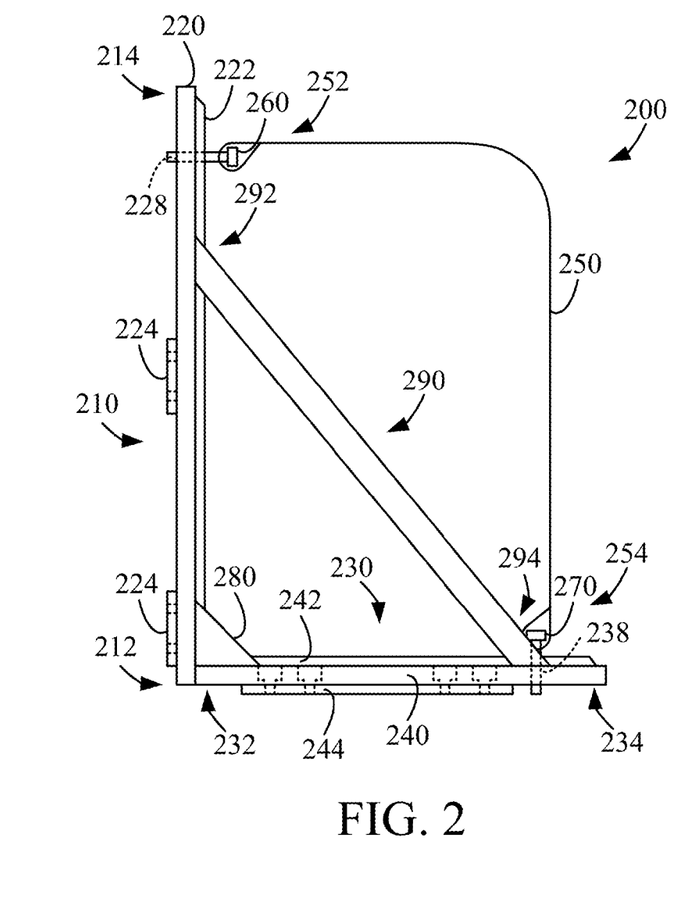
FIG. 2 is a side elevation view of an implementation of an end mounting bracket for an adjustable and/or reconfigurable mounting system.

FIG. 2 depicts a side elevation view of an implementation of an end mounting bracket 200 for an adjustable and/or reconfigurable mounting system. The end mounting bracket 200 includes a first vertical member 210 and a second horizontal member 230. The first vertical member 210 and the second horizontal member 230 are attached at a first end 212 of the first vertical member 210 and a first end 232 of the second horizontal member 230. In some implementations, the first end 212 of the first vertical member 210 and the first end 232 of the second horizontal member 230 may be welded together. In other implementations, the first vertical member 210 and the second horizontal member 230 may be of unitary construction such that the first vertical member 210 and the second horizontal member 230 form a single homogeneous continuum of material that is bent at the first end 212 of the first vertical member 210 and the first end 232 of the second horizontal member 230. In the implementation shown, the first end 212 of the first vertical member 210 and the first end 232 of the second horizontal member 230 form a substantially 90 degree angle relative to each other. In other implementations, the first end 212 of the first vertical member 210 and the first end 232 of the second horizontal member 230 may form an angle less than 90 degrees or greater than 90 degrees (e.g., between approximately 0 degrees, inclusive, and approximately 180 degrees, inclusive, such as 45 degrees, 60 degrees, 120 degrees, 135 degrees, etc.). In some implementations, an angled member 280 may be included where the first end 212 of the first vertical member 210 and the first end 232 of the second horizontal member 230 are joined and/or meet.

The end mounting bracket 200 also includes an angled retention member 290 coupled substantially near to a second end 214 of the first vertical member 210 and substantially near to a second end 234 of the second horizontal member 230. In some implementations, the angled retention member 290 may be welded to the first vertical member 210 and the second horizontal member 230. In other implementations, the angled retention member 290 may be of unitary construction such that the angled retention member 290, the first vertical member 210, and the second horizontal member 230 form a single homogeneous continuum of material. A first end 292 of the angled retention member 290 may be welded and/or integrally formed with the first vertical member 210 at various positions along a length, $L_v$, of the first vertical member 210, such as between $0.5L_v$ and $L_v$, inclusive. A second end 294 of the angled retention member 290 may be welded and/or integrally formed with the second horizontal member 230 at various positions along a length, $L_h$, of the second horizontal member 230, such as between $0.5L_h$ and $L_h$, inclusive. The angled retention member 290 is configured to retain an end of a component, such as an SCR catalyst, DPF, DOC, or other exhaust and/or aftertreatment component, longitudinally (i.e., into or out of the page depicting FIG. 2) when the component is secured to the end mounting bracket 200. In certain implementations, the angled retention member 290 may be omitted entirely for the end mounting bracket 200.

The first vertical member 210 includes a main member 220, a mounting pad 222, and a pair of vertical attachment plates 224. The main member 220 may be the portion of the first vertical member 210 that is welded and/or unitary with the second horizontal member 230. The main member 220 may be constructed of a metal material, such as steel or aluminum, a composite material, and/or other suitable material.

Attached to the main member 220 is the mounting pad 222. The mounting pad 222 may be an elongate strip of material having a width that is smaller than the main member 220 and is configured to have the component that is secured to the end mounting bracket 200 abut the mounting pad 222. In some implementations, the mounting pad 222 may be approximately 15 millimeters thick. The mounting pad 222 may be constructed of a metal material, such as steel or aluminum, a composite material, and/or other suitable material. The mounting pad 222 may be welded to the main member 220 along the edges of the mounting pad 222. The mounting pad 222 and the main member 220 include a first attachment opening 228 (e.g., a hole) into which a strap attachment member 260, such as bolt, may be inserted. In some implementations, the first attachment opening 228 may be threaded to receive the strap attachment member 260. In other implementations, the first attachment opening 228 may not be threaded and may permit the strap attachment member 260 to pass through the first attachment opening 228 to be secured to another object, such as a nut, a threaded plate, and/or a portion of a chassis or frame.

Also attached to the main member 220 is a pair of vertical attachment plates 224. The vertical attachment plates 224 are affixed to a back surface of the main member 220 and extend outwardly from both sides of the main member 220 (shown best in FIG. 4). The vertical attachment plates 224 each include one or more features, such as openings (e.g., holes) through which a surface attachment member, such as a bolt, a screw, etc., may be inserted and/or applied to, such as a clamp, a crank, etc., to attach the vertical attachment plate 224 to another surface or object, such as a chassis or frame. In the implementation shown herein, each vertical attachment plate 224 has four attachment openings, with two attachment openings on one side and another two attachment openings on the other side (shown best in FIG. 4). In some implementations, a first vertical attachment plate 224 may be coupled to the main member 220 substantially near the first end 212 of the first vertical member 210 and a second vertical attachment plate 224 may be coupled to the main member 220 substantially near a midpoint of the main member 220. In other implementations, the vertical attachment plates 224 may be coupled to the main member 220 at any position along the main member 220. The vertical attachment plates 224 may be welded to the main member 220 to affix the vertical attachment plates 224 to the main member 220. In other implementations, the vertical attachment plates 224 may be of unitary construction with the main member 220.

The second horizontal member 230 includes a main member 240, a mounting pad 242, and a horizontal attachment plate 244. The main member 240 may be the portion of the second horizontal member 230 that is welded and/or unitary with the first vertical member 210. The main member 240 may be constructed of a metal material, such as steel or aluminum, a composite material, and/or other suitable material.

Attached to the main member 240 is a mounting pad 242. The mounting pad 242 may be an elongate strip of material having a width that is smaller than the main member 240 and is configured to have the component that is secured to the end mounting bracket 200 abut the mounting pad 242. In some implementations, the mounting pad 242 may be approximately 15 millimeters thick. The mounting pad 242 may be constructed of a metal material, such as steel or aluminum, a composite material, and/or other suitable material. The mounting pad 242 may be welded to the main member 240 along the edges of the mounting pad 242. The mounting pad 242 and the main member 240 include a second attachment opening 238 (e.g., a hole) into which a strap attachment member 270, such as a bolt, may be inserted. In some implementations, the second attachment opening 238 may be threaded to receive the strap attachment member 270. In other implementations, the second attachment opening 238 may not be threaded and may permit the strap attachment member 270 to pass through the second attachment opening 238 to be secured to another object, such as a nut, a threaded plate, and/or a portion of a chassis or frame.

Also attached to the main member 240 is a horizontal attachment plate 244. The horizontal attachment plate 244 is affixed to a bottom surface of the main member 240 and extends outwardly from both sides of the main member 240 (shown best in FIG. 4). The horizontal attachment plate 244 includes one or more features, such as openings (e.g., holes) through which a surface attachment member, such as a bolt, a screw, etc., may be inserted and/or applied to, such as a clamp, a crank, etc., to attach the horizontal attachment plate 244 to another surface or object, such as a chassis or frame. In the implementation shown herein, the horizontal attachment plate 244 has two sets of four attachment openings with two attachment openings on one side and another two attachment openings on the other side (shown best in FIG. 4). In some implementations, the main member 240 may also include countersunk openings for the surface attachment members (e.g., to receive the head of a surface attachment bolt). In some implementations, the horizontal attachment plate 244 may be coupled to the main member 240 substantially near a midpoint of the main member 240. In other implementations, the horizontal attachment plate 244 may be coupled to the main member 240 at any position along the main member 240. The horizontal attachment plate 244 may be welded to the main member 240 to affix the horizontal attachment plate 244 to the main member 240. In other implementations, the horizontal attachment plate 244 may be of unitary construction with the main member 240.

An attachment strap 250 is used to secure a component, such as an aftertreatment component and/or exhaust component, to the end mounting bracket 200. The attachment strap 250 includes a first end 252 and a second end 254. The first and second end 252, 254 are configured to receive a portion of the strap attachment members 260, 270 to be secured to the end mounting bracket 200 via the first and second attachment openings 228, 238. In the implementation shown, the first and second ends 252, 254 are looped ends having an opening through which a portion of the strap attachment members 260, 270 can be inserted and secured to the end mounting bracket 200 via the first and second attachment openings 228, 238. The attachment strap 250 may be a metal strap in some implementations.

Figure 3:
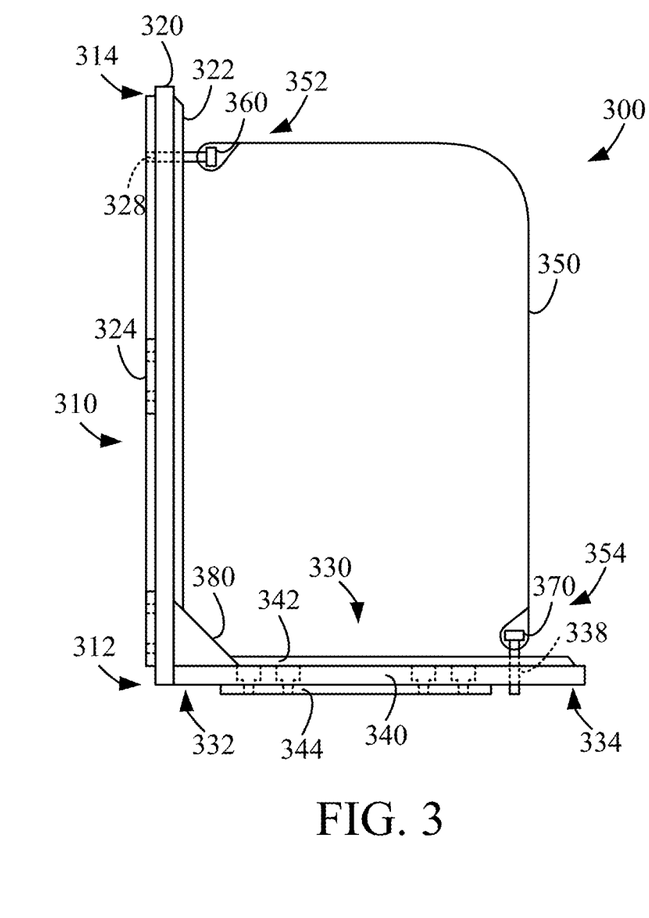
FIG. 3 is a side elevation view of an implementation of an intermediary mounting bracket for an adjustable and/or reconfigurable mounting system.

FIG. 3 depicts a side elevation view of an implementation of an intermediary mounting bracket 300 for an adjustable and/or reconfigurable mounting system. The intermediary mounting bracket 300 includes a first intermediary bracket vertical member 310 and a second intermediary bracket horizontal member 330. The first intermediary bracket vertical member 310 and the second intermediary bracket horizontal member 330 are attached at a first end 312 of the first intermediary bracket vertical member 310 and a first end 332 of the second intermediary bracket horizontal member 330. In some implementations, the first end 312 of the first intermediary bracket vertical member 310 and the first end 332 of the second intermediary bracket horizontal member 330 may be welded together. In other implementations, the first intermediary bracket vertical member 310 and the second intermediary bracket horizontal member 330 may be of unitary construction such that the first intermediary bracket vertical member 310 and the second intermediary bracket horizontal member 330 form a single homogeneous continuum of material that is bent at the first end 312 of the first intermediary bracket vertical member 310 and the first end 332 of the second intermediary bracket horizontal member 330. In the implementation shown, the first end 312 of the first intermediary bracket vertical member 310 and the first end 332 of the second intermediary bracket horizontal member 330 form a substantially 90 degree angle relative to each other. In other implementations, the first end 312 of the first intermediary bracket vertical member 310 and the first end 332 of the second intermediary bracket horizontal member 330 may form an angle less than 90 degrees or greater than 90 degrees (e.g., between approximately 0 degrees, inclusive, and approximately 180 degrees, inclusive, such as 45 degrees, 60 degrees, 120 degrees, 135 degrees, etc.). In some implementations, an angled member 380 may be included where the first end 312 of the first intermediary bracket vertical member 310 and the first end 332 of the second intermediary bracket horizontal member 330 are joined and/or meet.

The first intermediary bracket vertical member 310 includes a main member 320, a mounting pad 322, and a vertical attachment plate 324. The main member 320 may be the portion of the first intermediary bracket vertical member 310 that is welded and/or unitary with the second intermediary bracket horizontal member 330. The main member 320 may be constructed of a metal material, such as steel or aluminum, a composite material, and/or other suitable material.

Attached to the main member 320 is the mounting pad 322. The mounting pad 322 may be an elongate strip of material having a width that is smaller than the main member 320 and is configured to have the component that is secured to the intermediary mounting bracket 300 abut the mounting pad 322. In some implementations, the mounting pad 322 may be approximately 15 millimeters thick. The mounting pad 322 may be constructed of a metal material, such as steel or aluminum, a composite material, and/or other suitable material. The mounting pad 322 may be welded to the main member 320 along the edges of the mounting pad 322. The mounting pad 322 and the main member 320 include a first attachment opening 328 (e.g., a hole) into which a strap attachment member 360, such as a bolt, may be inserted. In some implementations, the first attachment opening 328 may be threaded to receive the strap attachment member 360. In other implementations, the first attachment opening 328 may not be threaded and may permit the strap attachment member 360 to pass through the first attachment opening 328 to be secured to another object, such as a nut, a threaded plate, and/or a portion of a chassis or frame.

Also attached to the main member 320 is a vertical attachment plate 324. The vertical attachment plate 324 is affixed to a back surface of the main member 320 and extends outwardly at two locations from both sides of the main member 320 (shown best in FIG. 4). The two portions of the vertical attachment plate 324 each include one or more features, such as openings (e.g., holes) through which a surface attachment member, such as a bolt, a screw, etc., may be inserted and/or applied to, such as a clamp, a crank, etc., to attach the vertical attachment plate 324 to another surface or object, such as a chassis or frame. In the implementation shown herein, each portion of the vertical attachment plate 324 that extends outwardly from the main member 320 has four attachment openings with two attachment openings on one side and another two attachment openings on the other side (shown best in FIG. 4). In some implementations, the vertical attachment plate 324 extends along the back side of the main member 320 for substantially the same span as the mounting pad 322. In other implementations, the vertical attachment plate 324 may be coupled to the main member 320 at any position along the main member 320. The vertical attachment plate 324 may be welded to the main member 320 to affix the vertical attachment plate 324 to the main member 320. In other implementations, the vertical attachment plate 324 may be of unitary construction with the main member 320.

The second intermediary bracket horizontal member 330 includes a main member 340, a mounting pad 342, and a horizontal attachment plate 344. The main member 340 may be the portion of the second intermediary bracket horizontal member 330 that is welded and/or unitary with the first intermediary bracket vertical member 310. The main member 340 may be constructed of a metal material, such as steel or aluminum, a composite material, and/or other suitable material.

Attached to the main member 340 is a mounting pad 342. The mounting pad 342 may be an elongate strip of material having a width that is smaller than the main member 340 and is configured to have the component that is secured to the intermediary mounting bracket 300 abut the mounting pad 342. In some implementations, the mounting pad 342 may be approximately 15 millimeters thick. The mounting pad 342 may be constructed of a metal material, such as steel or aluminum, a composite material, and/or other suitable material. The mounting pad 342 may be welded to the main member 340 along the edges of the mounting pad 342. The mounting pad 342 and the main member 340 include a second attachment opening 338 (e.g., a hole) into which a strap attachment member 370, such as a bolt, may be inserted. In some implementations, the second attachment opening 338 may be threaded to receive the strap attachment member 370. In other implementations, the second attachment opening 338 may not be threaded and may permit the strap attachment member 370 to pass through the second attachment opening 338 to be secured to another object, such as a nut, a threaded plate, and/or a portion of a chassis or frame.

Also attached to the main member 340 is a horizontal attachment plate 344. The horizontal attachment plate 344 is affixed to a bottom surface of the main member 340 and extends outwardly from both sides of the main member 340 (shown best in FIG. 4). The horizontal attachment plate 344 includes one or more features, such as openings (e.g., holes) through which a surface attachment member, such as a bolt, a screw, etc., may be inserted and/or applied to, such as a clamp, a crank, etc., to attach the horizontal attachment plate 344 to another surface or object, such as a chassis or frame. In the implementation shown herein, the horizontal attachment plate 344 has two sets of four attachment openings with two attachment openings on one side and another two attachment openings on the other side (shown best in FIG. 4). In some implementations, the main member 340 may also include countersunk openings for the surface attachment members (e.g., to receive the head of an attachment bolt). In some implementations, the horizontal attachment plate 344 may be coupled to the main member 340 substantially near a midpoint of the main member 340. In other implementations, the horizontal attachment plate 344 may be coupled to the main member 340 at any position along the main member 340. The horizontal attachment plate 344 may be welded to the main member 340 to affix the horizontal attachment plate 344 to the main member 340. In other implementations, the horizontal attachment plate 344 may be of unitary construction with the main member 340.

An attachment strap 350 is used to secure a component, such as an aftertreatment component and/or exhaust component, to the intermediary mounting bracket 300. The attachment strap 350 includes a first end 352 and a second end 354. The first and second end 352, 354 are configured to receive a portion of the attachment members 360, 370 to be secured to the intermediary mounting bracket 300 via the first and second attachment openings 328, 338. In the implementation shown, the first and second ends 352, 354 are looped ends having a opening through which a portion of the attachment members 360, 370 can be inserted and secured to the intermediary mounting bracket 300 via the first and second attachment openings 328, 338. The attachment strap 350 may be a metal strap in some implementations.

Figure 4:
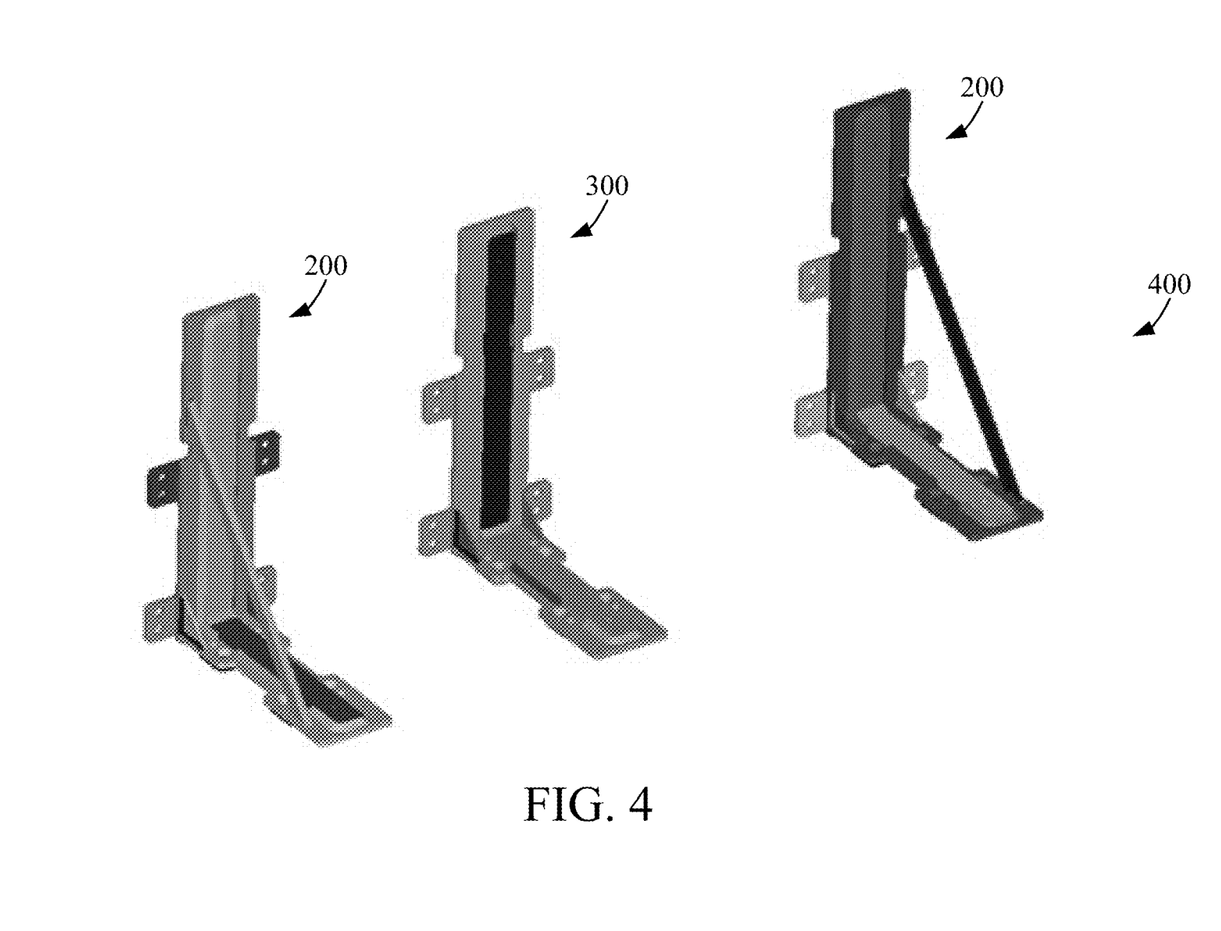
FIG. 4 is a perspective view of an implementation of an arrangement of a pair of end mounting brackets and an intermediary bracket for securing a component of an aftertreatment system and/or exhaust system.

FIG. 4 depicts an arrangement for a mounting system 400 having a pair of end mounting brackets 200 and an intermediary bracket 300 for securing a component of an aftertreatment system and/or exhaust system. For instance, the mounting system 400 with the pair of end mounting brackets 200 and the intermediary bracket 300 may be used for mounting an SCR catalyst to a chassis or frame. The SCR catalyst may be secured to the end mounting brackets 200 and the intermediary bracket 300 with attachment straps 250, 350, respectively. Thus, the pair of end mounting brackets 200, the intermediary bracket 300, and the attachment straps 250, 350 may substantially restrict the movement of the SCR catalyst in horizontal and vertical directions. The angled retention members 290 of the pair of end mounting brackets 200 restrict the movement of the SCR catalyst in the longitudinal direction. In implementations omitting the angled retention members 290, the attachment strap 250 may be tightened to restrict longitudinal movement of the SCR catalyst due to the frictional resistance and/or in combination with features of the SCR catalyst, such as a channel formed in the exterior of the SCR catalyst, a protrusion, etc. Accordingly, the SCR catalyst may be substantially secured to the chassis or frame to which the mounting system 400 is attached.

If the SCR catalyst is to be replaced, the attachment straps 250, 350 may be disengaged and/or loosened to allow the SCR catalyst to be removed from the mounting system, in some implementations. In other instances, the attachment straps 250, 350 may not be disengaged and/or loosened and the pair of end mounting brackets 200 and the intermediary bracket 300 may be detached from the chassis or frame to remove the entire mounting system 400, including the SCR catalyst. In some instances, one or more of the pair of end mounting brackets 200 and/or the intermediary bracket 300 may be detached from the chassis or frame and repositioned, reconfigured, removed, etc. to modify the configuration of the mounting system 400. For instance, if an updated SCR catalyst or other exhaust system component is desired to be added to the exhaust system of a vehicle or other apparatus having an exhaust system, then the mounting system 400 may be modified to accommodate the updated component without substantial difficulty due to the ability to modify the pair of end mounting brackets 200 and/or the intermediary bracket 300 by disengaging the surface attachment members that attach the pair of end mounting brackets 200 and/or the intermediary bracket 300 to the chassis or frame. Such surface attachment members and the pair of end mounting brackets 200 and/or the intermediary bracket 300 may still sufficiently secure the SCR catalyst or other exhaust system component to the chassis or frame to withstand required loads. For instance, the mounting system 400 may be configured to withstand a 4G load in the longitudinal direction, a 5G load in the vertical direction, and an 8G load in the horizontal direction while not experiencing excessive stress forces for the pair of end mounting brackets 200 and/or the intermediary bracket 300.

Figure 5:
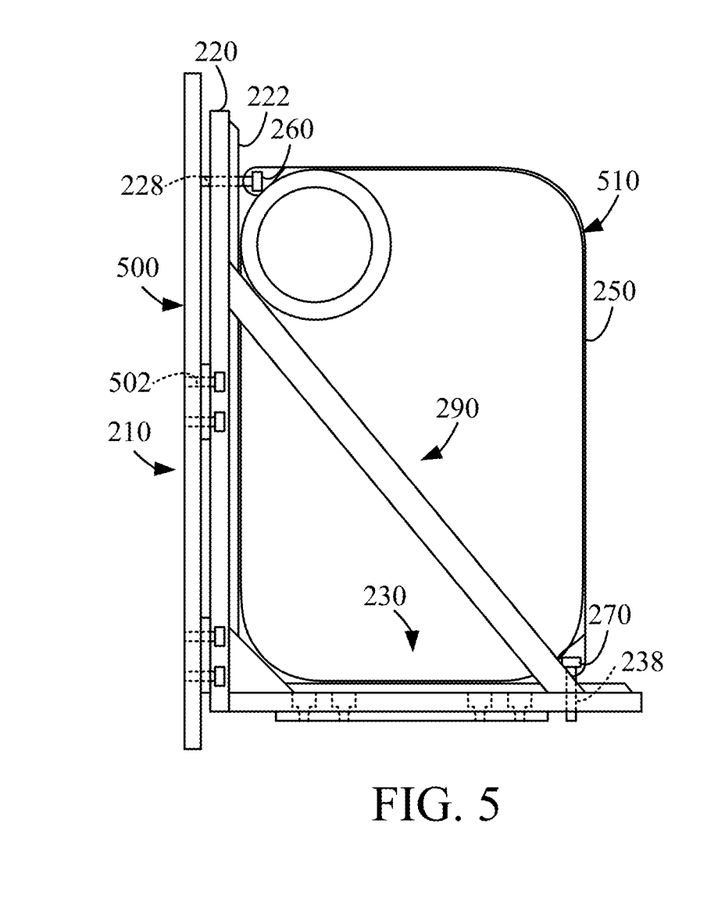
FIG. 5 is a side elevation view of the arrangement of FIG. 4 mounted to a vertical surface and securing an aftertreatment system component.

FIG. 5 depicts a side view of the mounting system 400 of FIG. 4 mounted to a vertical surface 500 and securing an aftertreatment system component 510, such as an SCR catalyst. An end mounting bracket 200 of the mounting system 400 is shown attached to the vertical surface 500 via a plurality of surface attachment members 502, such as eight bolts, that may extend through and/or thread into the vertical attachment plates and through and/or into the vertical surface 500. In some implementations, the surface attachment members 502 may have a second portion, such as a nut, into which the surface attachment members 502 thread to attach the end mounting bracket 200 to the vertical surface 500. One or more intermediary mounting brackets 300 may be similarly attached to the vertical surface 500.

As shown, the aftertreatment system component 510, such as an SCR catalyst, is secured to the mounting system 400 via attachment strap 250 (and similarly using attachment strap 350 for any intermediary mounting brackets 300). The strap attachment members 260, 270 secure the attachment strap 250 to the end mounting bracket 200. Thus, when the aftertreatment system component 510 is secured to the mounting system 400 via end mounting brackets 200 and/or one or more intermediary mounting brackets 300, the aftertreatment system component 510 is substantially secured relative to the vertical surface 500, such as a chassis or frame.

The aftertreatment system component 510 may be removed and/or adjusted by loosening the strap attachment members 260, 270 and the attachment strap 250. In other implementations, the aftertreatment system component 510 may be removed and/or adjusted by loosening one or more of the surface attachment members 502, thereby permitting removal and/or adjustment of the end mounting brackets 200 and/or one or more intermediary mounting brackets 300. The surface attachment members 502 may be retightened to a predetermined specification to resecure the mounting system 400 and the aftertreatment system component 510 to the vertical surface 500.

Figure 6:
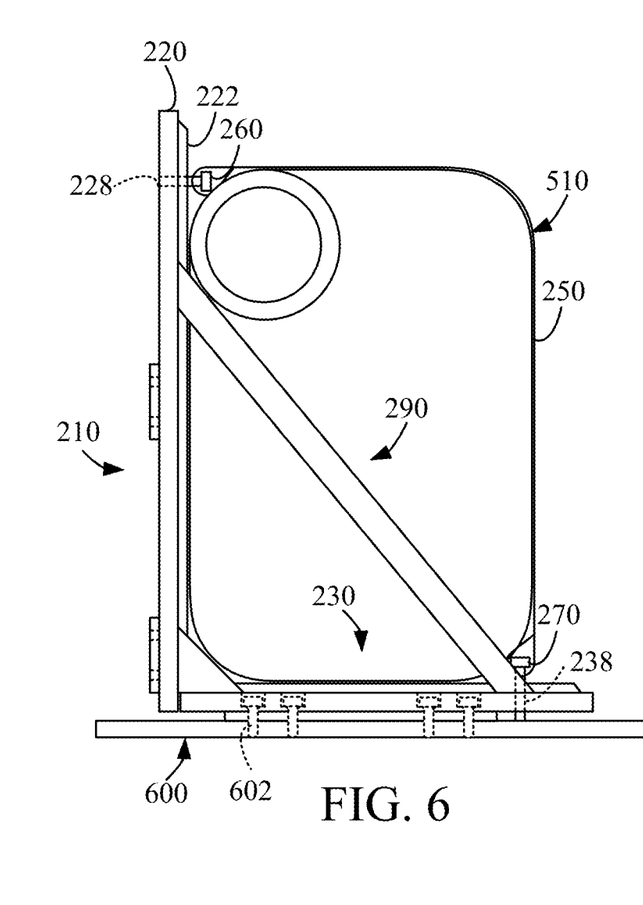
FIG. 6 is a side elevation view of the arrangement of FIG. 4 mounted to a horizontal surface and securing an aftertreatment system component.

FIG. 6 depicts a side view of the mounting system 400 of FIG. 4 mounted to a horizontal surface 600 and securing the aftertreatment system component 510. An end mounting bracket 200 of the mounting system 400 is shown attached to the horizontal surface 600 via a plurality of surface attachment members 602, such as eight bolts, that may extend through and/or thread into the horizontal attachment plate and through and/or into the horizontal surface 600. In some implementations, the surface attachment members 602 may have a second portion, such as a nut, into which the surface attachment members 602 thread to attach the end mounting bracket 200 to the horizontal surface 600. One or more intermediary mounting brackets 300 may be similarly attached to the horizontal surface 600.

As shown, the aftertreatment system component 510, such as an SCR catalyst, is secured to the mounting system 400 via attachment strap 250 (and similarly using attachment strap 350 for any intermediary mounting brackets 300). The strap attachment members 260, 270 secure the attachment strap 250 to the end mounting bracket 200. Thus, when the aftertreatment system component 510 is secured to the mounting system 400 via end mounting brackets 200 and/or one or more intermediary mounting brackets 300, the aftertreatment system component 510 is substantially secured relative to the horizontal surface 600, such as a chassis or frame.

The aftertreatment system component 510 may be removed and/or adjusted by loosening the strap attachment members 260, 270 and the attachment strap 250. In other implementations, the aftertreatment system component 510 may be removed and/or adjusted by loosening one or more of the surface attachment members 602, thereby permitting removal and/or adjustment of the end mounting brackets 200 and/or one or more intermediary mounting brackets 300. The surface attachment members 602 may be retightened to a predetermined specification to resecure the mounting system 400 and the aftertreatment system component 510 to the horizontal surface 600.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially," "approximately," and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

In the above description, certain terms may be used such as "up," "down," "upper," "lower," "horizontal," "vertical" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A mounting system for a component of an exhaust system comprising:
   one or more end mounting brackets, each of the one or more end mounting brackets comprising an end mounting bracket vertical member having a first strap attachment opening, an end mounting bracket horizontal member having a second strap attachment opening, one or more end mounting bracket attachment openings extending through a portion of the end mounting vertical member or the end mounting horizontal member, and an end mounting bracket attachment strap configured to secure a component of an exhaust system to the end mounting bracket vertical member via the first strap attachment opening and the end mounting bracket horizontal member via the second strap attachment opening; and
   one or more intermediary mounting brackets, each of the one or more intermediary mounting brackets comprising an intermediary mounting bracket vertical member having a third strap attachment opening, an intermediary mounting bracket horizontal member having a fourth strap attachment opening, one or more intermediary mounting bracket attachment openings extending through a portion of the intermediary mounting bracket vertical member or the intermediary mounting bracket horizontal member, and an intermediary mounting bracket attachment strap configured to secure the component of the exhaust system to the intermediary mounting bracket vertical member via the third strap attachment opening and the intermediary mounting bracket horizontal member via the fourth strap attachment opening,
   wherein the one or more end mounting brackets and the one or more intermediary mounting brackets are configured to be selectively attached and detached from a mounting surface via one or more surface attachment members using the one or more end mounting bracket attachment openings or the one or more intermediary mounting bracket attachment openings, respectively.

2. The mounting system of claim 1, wherein the end mounting bracket vertical member and the end mounting bracket horizontal member of each of the one or more end mounting brackets each comprise a mounting pad.

3. The mounting system of claim 1, wherein the intermediary mounting bracket vertical member and the intermediary mounting bracket horizontal member of each of the one or more intermediary mounting brackets each comprise a mounting pad.

4. The mounting system of claim 1, wherein the end mounting bracket vertical member of each of the one or more end mounting brackets comprises two or more vertical attachment plates.

5. The mounting system of claim 1, wherein the mounting surface is a vertical mounting surface or a horizontal mounting surface.

6. The mounting system of claim 1, wherein the component is an SCR catalyst.

7. The mounting system of claim 1, wherein the one or more end mounting brackets are configured to be selectively attached and detached from both a vertical mounting surface or a horizontal mounting surface via at least one of the one or more surface attachment members and the one or more end mounting bracket attachment openings.

8. The mounting system of claim 1, wherein the one or more intermediary mounting brackets are configured to be selectively attached and detached from both a vertical mounting surface or a horizontal mounting surface via at least one of the one or more surface attachment members and the one or more intermediary mounting bracket attachment openings.

9. The mounting system of claim 1, wherein the one or more end mounting brackets comprise at least one end mounting bracket attachment opening extending through a portion of the vertical member and at least one end mounting bracket attachment opening extending through a portion of the horizontal member.

10. The mounting system of claim 1, wherein the one or more end mounting brackets are two end mounting brackets, and wherein the one or more intermediary mounting brackets are one intermediary mounting bracket.

11. The mounting system of claim 1, wherein the end mounting bracket vertical member and the end mounting bracket horizontal member of each respective end mounting member of the one or more end mounting members are of unitary construction.

12. The mounting system of claim 1, wherein each of the one or more end mounting brackets further comprises an angled retention member.

13. The mounting system of claim 12, wherein the one or more end mounting brackets and the one or more intermediary mounting brackets restrict the horizontal and vertical movement of the component and the angled retention member of the one or more mounting brackets restricts the longitudinal movement of the component when the component is secured to the one or more end mounting brackets and the one or more intermediary mounting brackets.

14. A mounting system for a component of an exhaust system comprising:
   one or more end mounting brackets, each of the one or more end mounting brackets comprising an end mounting bracket vertical member, an end mounting bracket horizontal member, one or more end mounting bracket attachment openings extending through a portion of the end mounting vertical member or the end mounting horizontal member, and an end mounting bracket attachment strap configured to secure a component of an exhaust system to the end mounting bracket vertical member and the end mounting bracket horizontal member; and
   one or more intermediary mounting brackets, each of the one or more intermediary mounting brackets comprising an intermediary mounting bracket vertical member, an intermediary mounting bracket horizontal member, one or more intermediary mounting bracket attachment openings extending through a portion of the intermediary mounting bracket vertical member or the intermediary mounting bracket horizontal member, and an intermediary mounting bracket attachment strap configured to secure the component of the exhaust system to the intermediary mounting bracket vertical member and the intermediary mounting bracket horizontal member,
   wherein the one or more end mounting brackets and the one or more intermediary mounting brackets are configured to be selectively attached and detached from a mounting surface via one or more surface attachment members using the one or more end mounting bracket attachment openings or the one or more intermediary mounting bracket attachment openings, respectively, and
   wherein the end mounting bracket attachment strap of each of the one or more end mounting brackets is configured to secure the component of the exhaust system via a first strap attachment member and a second strap attachment member, the first strap attachment member securing a first portion of the end mounting bracket attachment strap to the end mounting bracket vertical member of a respective end mounting bracket of the one or more end mounting brackets and the second strap attachment member securing a second portion of the end mounting bracket attachment strap to the end mounting bracket horizontal member of the respective end mounting bracket of the one or more end mounting brackets.

15. The mounting system of claim 14, wherein the end mounting bracket vertical member and the end mounting bracket horizontal member of each of the one or more end mounting brackets each comprise a mounting pad.

16. The mounting system of claim 14, wherein the intermediary mounting bracket vertical member and the intermediary mounting bracket horizontal member of each of the one or more intermediary mounting brackets each comprise a mounting pad.

17. The mounting system of claim 14, wherein the component is an SCR catalyst.

18. The mounting system of claim 17, wherein the one or more end mounting brackets and the one or more intermediary mounting brackets are configured to be selectively attached and detached from a mounting surface without removing the SCR catalyst secured by the one or more end mounting brackets and the one or more intermediary mounting brackets.

19. The mounting system of claim 14, wherein each of the one or more end mounting brackets further comprises an angled retention member.

20. The mounting system of claim 19, wherein the one or more end mounting brackets and the one or more intermediary mounting brackets restrict the horizontal and vertical movement of the component and the angled retention member of the one or more mounting brackets restricts the longitudinal movement of the component when the component is secured to the one or more end mounting brackets and the one or more intermediary mounting brackets.

* * * * *